March 19, 1968   A. H. PARMENTIER   3,373,873
MULTIPLE ELEMENT, HORIZONTALLY ROTATING, FILTER
PANS HAVING PIVOTING BOTTOMS
Filed March 17, 1966   6 Sheets-Sheet 1

INVENTOR
ALFRED H. PARMENTIER,

BY *Yungblut, Melville, Strasser and Foster*
ATTORNEYS

March 19, 1968  A. H. PARMENTIER  3,373,873
MULTIPLE ELEMENT, HORIZONTALLY ROTATING, FILTER
PANS HAVING PIVOTING BOTTOMS
Filed March 17, 1966  6 Sheets-Sheet 2

INVENTOR
ALFRED H. PARMENTIER,

BY *Yungblut, Melville, Strasser and Foster*
ATTORNEYS

March 19, 1968  A. H. PARMENTIER  3,373,873
MULTIPLE ELEMENT, HORIZONTALLY ROTATING, FILTER
PANS HAVING PIVOTING BOTTOMS
Filed March 17, 1966  6 Sheets-Sheet 4

INVENTOR
ALFRED H. PARMENTIER,

BY Yungblut, Melville, Strasser and Foster
ATTORNEYS

March 19, 1968 A. H. PARMENTIER 3,373,873
MULTIPLE ELEMENT, HORIZONTALLY ROTATING, FILTER
PANS HAVING PIVOTING BOTTOMS
Filed March 17, 1966 6 Sheets-Sheet 5

INVENTOR

ALFRED H. PARMENTIER,

BY Yungblut, Melville, Strasser and Foster
ATTORNEYS

March 19, 1968 A. H. PARMENTIER 3,373,873
MULTIPLE ELEMENT, HORIZONTALLY ROTATING, FILTER
PANS HAVING PIVOTING BOTTOMS
Filed March 17, 1966 6 Sheets-Sheet 6

Fig. 20

INVENTOR
ALFRED H. PARMENTIER,
BY *Yungblut, Melville, Strasser and Foster*
ATTORNEYS

United States Patent Office 3,373,873
Patented Mar. 19, 1968

3,373,873
MULTIPLE ELEMENT, HORIZONTALLY ROTATING, FILTER PANS HAVING PIVOTING BOTTOMS
Alfred H. Parmentier, 3 La Bruyere,
Lillois, Brabant, Belgium
Filed Mar. 17, 1966, Ser. No. 535,072
Claims priority, application Luxembourg,
May 12, 1965, 48,582
4 Claims. (Cl. 210—236)

ABSTRACT OF THE DISCLOSURE

A continuous rotary filter adapted for operation under vacuum or under pressure, comprising a plurality of filtering pans mounted for rotation in a horizontal plane around a vertical axis; a plurality of filter cells in each pan; a bottom for each pan pivotally secured thereto along one edge by a hinge having a horizontal axis; watertight seal between each pan and its bottom extending around the periphery of the bottom; means for holding each bottom in close engagement with its pan during a portion of the rotary travel thereof; means for releasing each bottom for swinging movement downwardly about the horizontal hinge during another portion of the rotary travel thereof; means for applying a vacuum to the interiors of the cells, or for distributing liquid under pressure to the exteriors of the cells, during the first-mentioned portion of the rotary path of travel and connections between these means and the pans for removing liquid passing through the cells; means for removal of solids deposited on the cells during the other portion of the rotary path of travel; and means for thereafter swinging each bottom upwardly into watertight engagement with its pan.

---

The present invention relates to continuous, rotary filters with great filtration area and to a process for continuous filtration.

The successive operations to carry out a filtration constitute the filter operational cycle.

In general, they consist, when complete, of:

The filtration proper, so called, which separates the solids (cake) from the liquid (filtrate);
One or more washings for the purification of the cake;
The partial drying of the cake;
The distance of a great part of the solids;
The regeneration of the filtering cloth by washing, which eliminates the residual solids, including that imbedded in the cloth meshes. It ensures at the same time the declogging of the cloth, if the slurry has encrusting properties;
The drying of the filter cloth.

For filtering, a difference is created between the existing absolute pressures on each side of a filtering cloth.

This difference may be obtained in two ways:

(a) vacuum, in filters under vacuum
(b) pressure, in filters under pressure.

A filter works in a continuous way, when it is not required to stop an operation of the cycle in order to pass on to the next one.

To this effect, each one of the operations is made on a part of the filtering area, which must be successively presented under the mechanism corresponding to each operation of the cycle.

Consequently, continuous filters shift the filtering area, i.e., they are rotary.

Static filters present the whole of the filtering cloth surface, at the same time, for each operation. These follow each other, but the performance is not continuous, even if it is made according to an automatic program (filter presses, for example).

Among the continuous rotary filters one may find:

Filters under vacuum—
 Drum filters,
 Band filters,
 Tilting pan filters,
 Turning bucket filters,
 Horizontal table filters, and
 Disc filters.

The filtering area is at the maximum the area of the moving surface, that is the surface of the drum, of the band, of the table, of the sum of the unit surfaces of the pans, of the buckets, or of the discs.

Filters under pressure:
 Disc filters.

Disc filters under vacuum or under pressure can only carry out a very limited operational cycle.

In order to perform an operation on a part of the filtering area, the conventional continuous rotary vacuum filters are subdivided in:

Unseparated sectors like those of the drum filters, of the band filters, of the horizontal table filters, of the disc filters, or in;
Separated pans like those of the tilting pan filters or the bucket filters.

In these latter machines, the pans drop down, and the buckets overturn, in order to allow the removal of the solid and the washing of the filtering cloth.

The dropping down or the overturning refers to the entire pan or bucket and not to one of its constituent parts only.

To that effect, the filter cloth, applied on the bottom of the pan is single ply and its maximum surface is that of the cell or the bucket bottom. The filtering area is therefore limited.

The traveling ways which drive the pans or the buckets must alter their operational plane in order to allow the dropping down or the overturning. They are therefore of an elaborate construction.

The pans and the buckets being separated, the gap between two of these neighboring elements has to be covered in order to avoid liquids passing into this space. Because of the dropping down or of the overturning, this cover can be secured to but a single element. It cannot ensure watertightness, at any moment, particularly when the cells or the buckets are no longer in line during the filtering cloth washing. In order to remove the solids and to wash the cloth, it is absolutely necessary that each pan or bucket of these filters should be uncovered in its upper part.

On account of this, pan or bucket filters can only work under vacuum and never under pressure.

The present invention relates to continuous, rotary filters, the pans of which are rigidly connected, since they do not overturn. The bottom of each pan tilts. Watertightness is ensured between the pan and its bottom. The filtering cloth is not stretched over the bottom.

On the contrary, numerous cells covered with the filtration cloth, to be differentiated from the bottom of the pan, give a filtration area 4 to 8 times larger, for the same space, than for the filters actually known to be continuous, rotary and able to perform a complete operational cycle.

The principles of the present invention are applicable to vacuum as well as to pressure.

It is obvious that the accessories and the satellite equipment of the filters, according to the invention, are specific to the use either of vacuum or of pressure.

The present invention includes alternative nonrestrictive applications. Those that could eventually be added by making use of the principles hereinafter described remain within the scope of the invention.

The process and the essential apparatus are hereafter described and later on the alternative apparatus, the whole in conformity with the invention.

The first part refers to the accompanying drawings:

FIGURE 3, diagrammatic elevational view of the filter cloth washing ramps.

FIGURE 4, diagrammatic top view of the devices relative to the solids removal and the filter cloth washing.

FIGURE 5, diagrammatic front view of the same devices.

The filter includes from 8 to 32 pans 1, in which are placed the filtration cells, covered with filter cloth.

In principle, the pans are identical and separately constructed. However they can be built in groups and these groups may be assembled or the whole may even be built in one block. However, reasons of construction lead to the first solution.

Their shape is trapezoidal. The sides corresponding to the longer and shorter base are straight or circular.

To make up a rigid assembly, cross pieces 2 fixed on the radial walls of the pans permit their connection by bolting, welding or any other way.

All the pans bear on the short inner side a roller 3, rolling in the traveling way 4 and on the longer outer side two rollers 5 rolling in the outer traveling way 6.

These traveling ways may for example be made of U-shaped bars or other curved profiles. They are continuous, circular, level and horizontal.

To allow the assembly of the pans, a part 7 which can easily be disassembled is fitted in the external traveling way.

This latter is supported by columns 8 secured on the ground.

Figure 1:
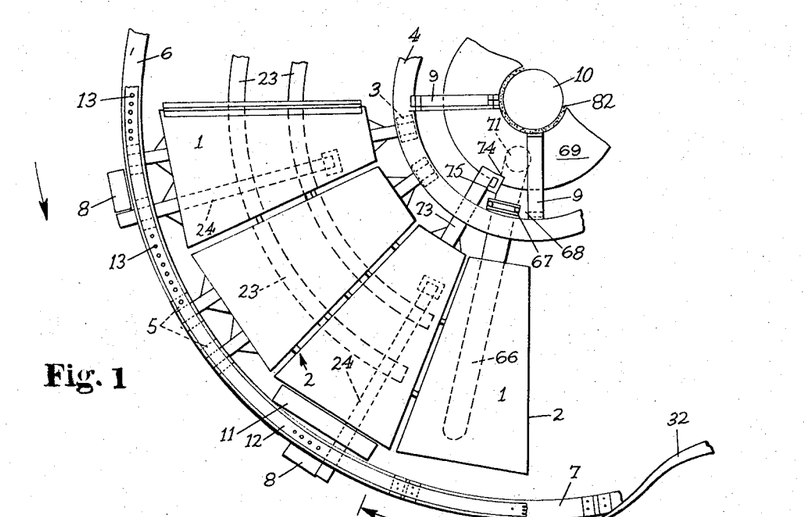
FIGURE 1, diagrammatic plan view of the principal parts of the apparatus.

These are uniformly spaced, but there is no column in the zone marked H in FIGURE 1, for reasons explained further on.

The inner traveling way is maintained by holders 9 fixed at the central column 10. The assembly of the three parts makes up the filter carrying framework.

On top of the outer rollers, a piece 11 is fixed at each pan. It fits on one side the form of the pan and is circular on the other side where it holds a U-shaped circular bar 12, continuous, horizontal and level.

In the wings of this U-shaped bar axles 13 are precisely secured in order to make up the teeth of the toothed rack. Owing to the said toothed rack, the rigid assembly of the pan may be driven in even rotation and continue at an adjustable speed, by an appropriate control device.

The bottom of each pan bears on its inner perimeter an L-shaped bar 14 or of any other suitable shape, the horizontal part of which is used as a support for a watertight joint which will be described later on.

The outer vertical wall of each pan bears at its bottom a hinge composed of three sets of pieces: flat irons 15 bored for axle 16 which holds the flat irons 17 which are fixed to the pan tilting bottom 18. The axle 16 is tangential to the rotary path of travel of the pans. This bottom is a trapezoidal plate equal to the dimensions of the pan, girdled by a U-shaped iron bar 19, the opening of which is directed towards the top and in which is placed a watertight joint 20 of the pan, preferably made of a molded rubber tube or bearing or other flexible material.

On top of and underneath each bottom, rollers 21 are fixed by the supports 22. They operate on the traveling ways 23, circular, horizontal and level, held by cross bars and posts 24 secured on the ground. Spacing pieces placed on the cross bars allow the height of the traveling way to be adjusted. The appropriate crushing of the pan watertight joint is obtained by adjusting these spacing pieces, the distance between these latter traveling ways and those of the inner and outer pan rollers.

The bottom pivots downwardly and is lifted up in the zone H. In this space no obstacle should be found. For tilting, the traveling ways of the rollers fixed on the tilting bottom are interrupted in this zone H.

The bottom, no longer supported, tilts downwardly when it reaches this interruption by its own weight, and its drop carries it beyond the vertical plane.

Figure 2:
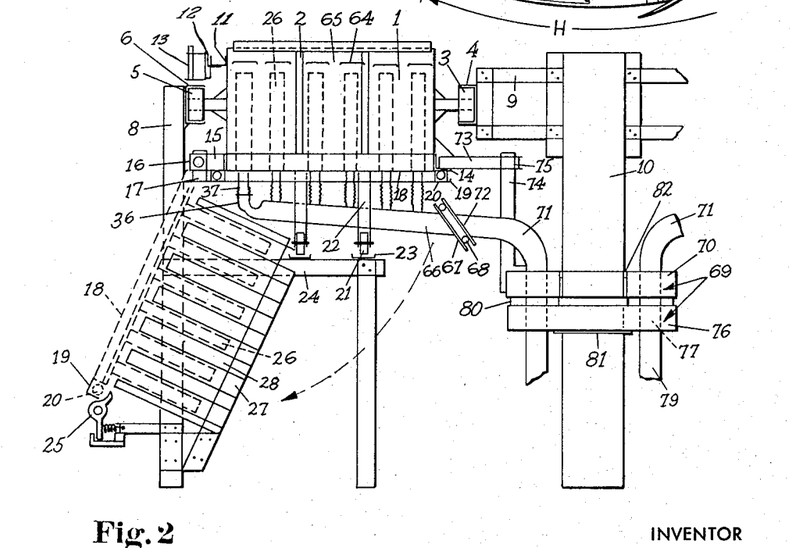
FIGURE 2, diagrammatic elevational view of the same apparatus.

When passing through zone H, it makes the sprung lug 25 swivel, and this latter keeps it in an inclined position represented in dotted lines in FIGURE 2. Let us assume for the time being that the filtration cells 26 are in a vertical position when the bottom is in its normal working position, not tilted. The cells are accessible after the tilting of the bottom, as represented also in dotted lines. The inclined tilted bottom presents itself in its motion in front of the fixed arm 27 holding the scrapers 28 made out of reinforced flat iron or of any other profile which pass at several millimeters distance from the filtration cells, as represented with the mechanisms hereafter mentioned in FIGURES 3, 4 and 5.

In the filter rotating direction, following later on, held by a pipe 29 for water injection under pressure, are the washing ramps 30 operating on the filter cloth. Their output is adjustable by means of valves. Bands of flexible material (rubber or any other kind of material) 31 fixed to the ramps avoid any water projections.

In this rotary motion, the bottom runs past the last flexible bands, is set free by the lug 25 and assumes the plane of gravity.

One of the bottom rollers is engaged by a large sheet metal or other profile 32 spirally curved between the position of the said roller when the bottom is tilted downwardly and the position of the same roller when the bottom is horizontal.

At these last positions the traveling ways which were interrupted are resumed. The entry into these ways is widened in tulip shape in order to facilitate the engagement.

The above described fundamental principles are the same for all the embodiments of application of the filter and of the alternative object of the following second part of the description:

A—PANS

If the filter works under vacuum, the pans are open at the top; under pressure, the pans are closed at the top.

In both cases the filling of the pans is done from the top. Under vacuum, in order to avoid liquid flow into the space between two neighboring pans, a cover plate, metallic or of any other material, is fixed in this space—besides it can be used as a bridge. Since the pans are not subject to any overturning or tilting movement, the cover is rigidly fixed and watertightness is total.

B—FILTERING CELLS

In principle the cells are fixed to the tilting bottom. In normal filtration position, they can be:

(a) vertical, then fixed at right angles to the bottom;
(b) horizontal, then fixed parallel to the bottom;
(c) inclined on the horizontal but fixed parallel to the bottom.

Figures 3, 4, 5, 6, 7, 7A, 8A:
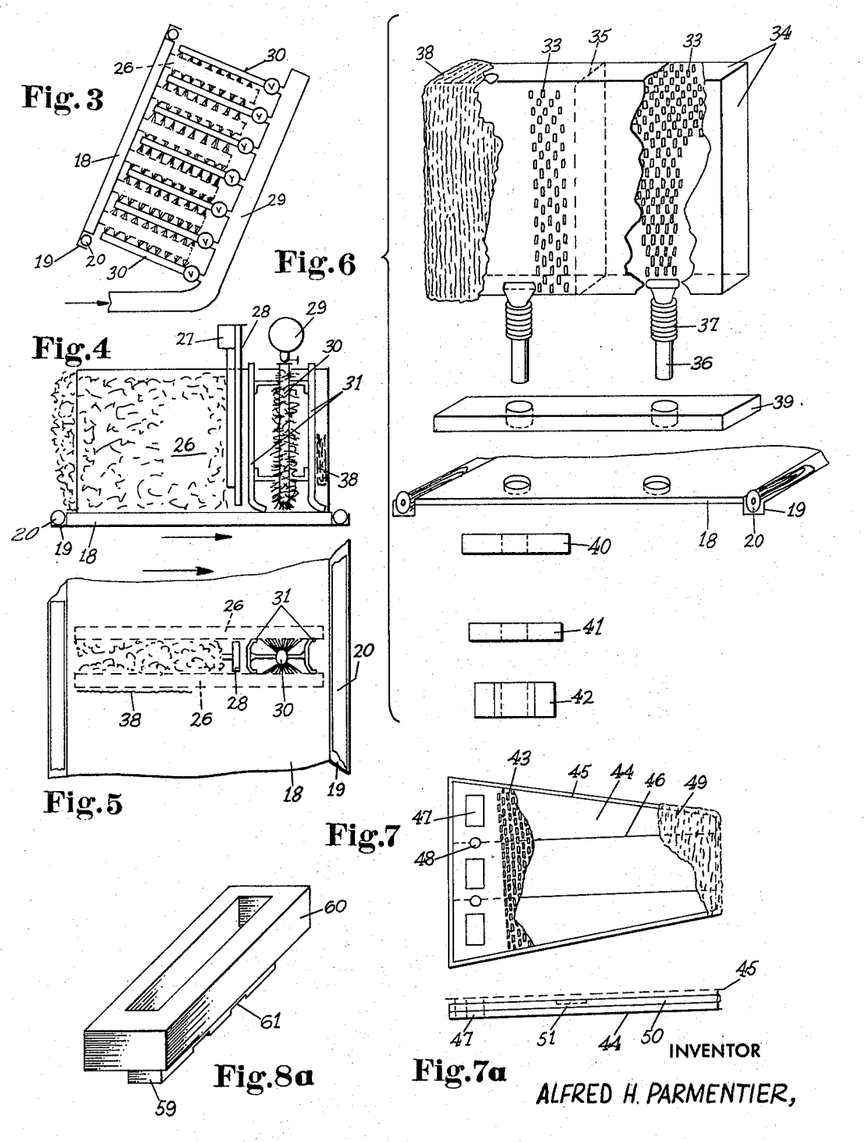

(a) Vertical cells are mainly used whenever the percentage of solids in the slurry is not high, and the solids do not settle too fast. They are normal to the tilting bottom bases, all have the same height, but their width increases between the smaller and the larger base of the trapezium. They cannot impede the tilting of the bottom. Each cell, as represented in FIGURE 6, is made of two perforated walls 33, separated across the width of the cell by non-perforated sides 34 and cross pieces 35 which ensure mechanical resistance to vacuum or to pressure. The side resting on the bottom is fitted with one or more pipes 36 for the filtrate outlet. In their upper part these pipes have a threaded part 37 which goes through the bottom. Before being fitted on the bottom, each cell is covered by a sack made of filter cloth 38 sewn except at its bottom part.

The free edges are folded and adhered on the bases of the cell. Between the cell and the bottom is a joint 39 made of flexible material which will squeeze the adhered cloth. Cut-out openings are provided for the threaded pipes. On the other side of the bottom, on the outside, the squeezing is done by a joint of flexible material 40, the metallic washer 41 and the fastener nut 42 which engages on the threaded part of the filtrates pipe.

(b) The horizontal cells are preferably used whenever the filtered solids are of a high density. Each horizontal cell, FIGURES 7, 7a, is made of the perforated upper wall 43 and a non-perforated lower wall 44. The thickness of the cell is determined by the sides 45 made of small U-shaped iron bars, opening to the outside and of cross pieces 46, to ensure mechanical resistance of the cell.

The cells are trapezoidal like the pan, but their length must allow easy tilting of the pan.

In both walls, along the longer base and for each passage in between the sides and the cross pieces, or in between the cross pieces, there are oblong openings 47 for the filtrate outlet. In the center of the wall parts remaining in between the oblong openings, a drill hole 48 is provided. The filter cloth 49 is only applied on the perforated upper wall. It is maintained in position by squeezing inside the U forming the sides, for example, by a large ring 50 with fastening screws 51 or by a tube, or by a holding beading of flexible material.

Figures 8, 9, 10, 11, 12, 13, 14:
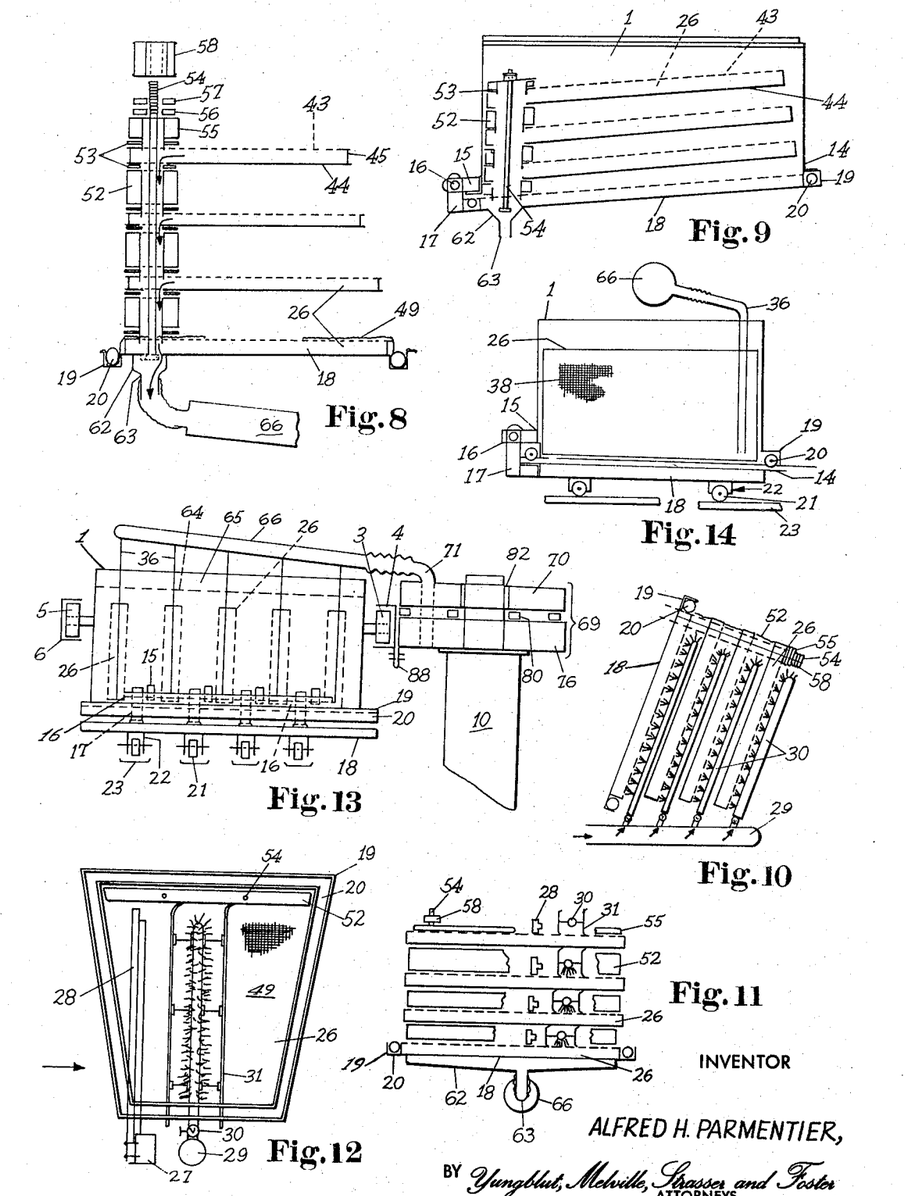

FIGURE 8, a diagrammatic view in elevation of a horizontal cell pan, shows that the distance between two cells and the holding thereof in position are obtained by spacing pieces 52, the joints of flexible material 53, the threaded stem 54, a small shorter spacing piece 55, the flexible joint 56, the metallic washer 57 and the fastening nut 58.

Each spacing piece, FIGURE 8a, is made of a box 59 of metal or plastic material, without cover and without bottom, contained in a box of lesser height 60, which is welded to the first one in a watertight way.

The two boxes are welded at the same level in the top plane.

The protruding lower part has cut-outs 61 which correspond to the wall parts existing between the oblong openings 47. The spacing piece has the same length as the width of the cells at the openings. The base of the spacing piece may enter by a few millimeters into these oblong openings, thus firmly keeping the spacing pieces in their position.

The tilting bottom is itself transformed into a cell where it represents the non-perforated lower wall. In this case, the cloth is held underneath the watertight joint of the span.

Underneath the bottom oblong openings is fixed a box 62 with walls inclined towards one or more filtrate outlet pipes 63.

(c) The inclined cells are preferably used whenever a fastener outflow is desired, for instance for viscous liquids. They are constructed and may be described in the same manner as for the horizontal cells, but as represented in FIGURE 9, diagrammatic view of an inclined cell pan, the pan base is no longer horizontal but inclined towards the filtrate outlet, the spacing piece angles are no longer right angles.

When the cells are horizontal or inclined, it is obvious that the length and the inclination of the solids scrapers and of the cloth washing ramps should be adapted, without necessarily changing their principle of conception.

The washing ramps spray but one filtering wall.

The follow figures represent these parts when the cells are horizontal or inclined.

FIGURE 10, a diagrammatic elevation of the filter cloth washing ramps.

FIGURE 11, a diagrammatic top view of the solids removal devices and of the cloth washing.

FIGURE 12, a diagrammatic front view of the same devices.

The three types of cells, vertical, horizontal and inclined, are used in identical conditions under vacuum or under pressure.

C—VERTICAL CELLS JOINED TO THE PAN

In general the cells are fixed on the bottom, as mentioned before.

If the cake easily breaks off by blowing air inside the cells and if the slurry is not clogging, the cells may be fixed at the radial walls of the pan ignoring the tilting bottom. They may be vertical only for utilization.

Each cell is constructed like the vertical cells described before, except that the filtrate pipes are no longer welded at the bottom of the cell. They start from the bottom of the cell and come out from the top as indicated in FIGURE 13.

Consequently, this device may only be utilized for filters under vacuum. In this case also, the bottom tilting hinge may be fixed as hereabove described but may also be radially fixed against the bottom of the pan as also indicated by FIGURE 13.

The bottom of the cell joined to the pan may be inclined in order to drain the filtrates towards a low point. The base of the pan is inclined in order to satisfy this position.

It is obvious that if the cells are joined to the pan, the solids scrapers and the filter cloth washing ramps are omitted.

D—SLURRY AND WASHING LIQUID DISTRIBUTOR

In order to avoid attrition of the cakes already formed or under formation, a distributor 64 is utilized. In case of vertical cells, it is made of a plate drilled with windows 65 not occupying the whole width of the pan, placed underneath the cells. The windows have a width of about 10 millimeters and are positioned on top of the center of the space between two cells (FIGURE 2).

When the cells are horizontal or inclined, the distributor is made of perforated sheet material, of the same dimensions as the pan, and is placed on top of the cells.

E—FILTRATE COLLECTOR

The pipes used for the filtrate discharge from the cells are connected with flexible or quick-fastening couplings to a collector 66. If the filter works under pressure the collector is a piping with an open mouth. If the filter works under vacuum the collector (FIGURE 11) is also used to transmit vacuum to the inside of the cells from a vacuum distributor which will be mentioned hereinafter.

When the cells (vertical) are joined to the pan of FIGURE 13, the collector is in the axis of and on top of the pan.

It does not tilt with the bottom. It is in this case linked with a corresponding pipe to the vacuum distributor by a flexible means the same as in all of the actual filters.

When the cells are joined to the tilting bottom, the collector is fixed in the axis of and underneath the pan. It tilts together with the bottom. This tilting must be easy, and the vacuum circuit must be made airtight when the bottom has resumed its normal position. In order to attain these goals, the collector under vacuum is fitted with a flange of large dimension 67, inclined and fitted with an airtight joint 68 for the vacuum circuit, in the form of a beading of flexible material, housed in a circular groove integral with the flange.

This joint is crushed when the bottom takes its normal position, against a wide flange of the vacuum distributor pipe, which corresponds to the pan under consideration.

The position of the collector may be adjusted in all directions on its attachments at the bottom of the pan. The tilting of the bottom is easily done, the flanges not being linked.

F—DISTRIBUTOR

The vacuum distributor is a conventional apparatus, in the public domain. See FIGURES 1–2 and FIGURE 15, diagrammatic plan view of the mobile part of the distributor.

Figure 16:
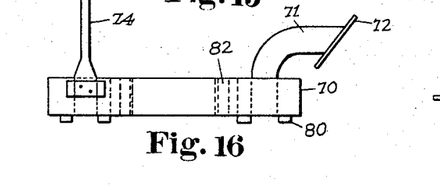

FIGURE 16, diagrammatic front view of the mobile part.

Figure 17:
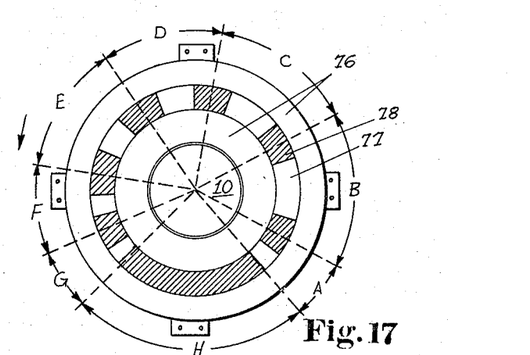

FIGURE 17, diagrammatic plan view of the fixed part of the distributor.

Figure 18:
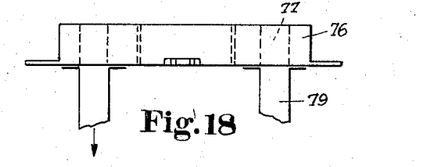

FIGURE 18, diagrammatic front view of the fixed part.

Figure 15:
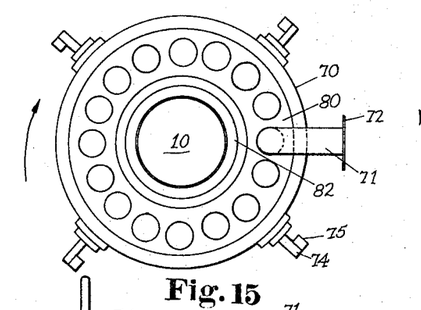

The distributor 69 is made of three parts:

(1) A mobile part 70 made of a circular ring of welded sheets, in the flat face of which are uniformly spaced as many pipes 71 as there are pans in the filter. Each pipe holds a wide ring 72 which has been mentioned, for the airtight crushing joint of the vacuum circuit.

This mobile part has to turn in synchronization with the pans. These bear free arms 73 which correspond to the arms 74 fixed on the mobile part.

The rotary motion of the filter forces the rotation of this part.

In order to absorb the jerk between the arms, the rubber block 75 is fixed on each arm of the mobile part. Four or six arms are sufficient to transmit the strains.

(2) A fixed part 76 made of a closed circular ring and of welded sheets, in the flat face of which are found openings 77 separated by partition walls 78. Underneath the openings are fixed pipes 79 for the filtrate outflow which cross the distributor from top to bottom, towards separators.

(3) An airtight joint 80 around the mobile part pipes, is placed between the fixed part and the mobile part.

The fixed part is correctly established on the seat 81 of the central column of the filter. The lubricated ring 82 ensures an even rotation of the mobile part.

The vacuum causes the mobile part to press against the airtight joint.

Figure 19:
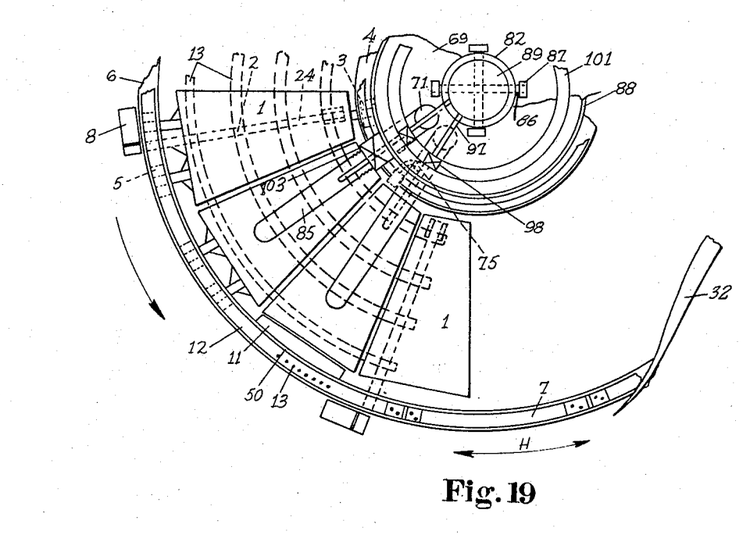

The distributor for fluids under pressure is represented by:

FIGURE 19, diagrammatic plan view of the principal mechanism of a pressure filter.

Figure 20:
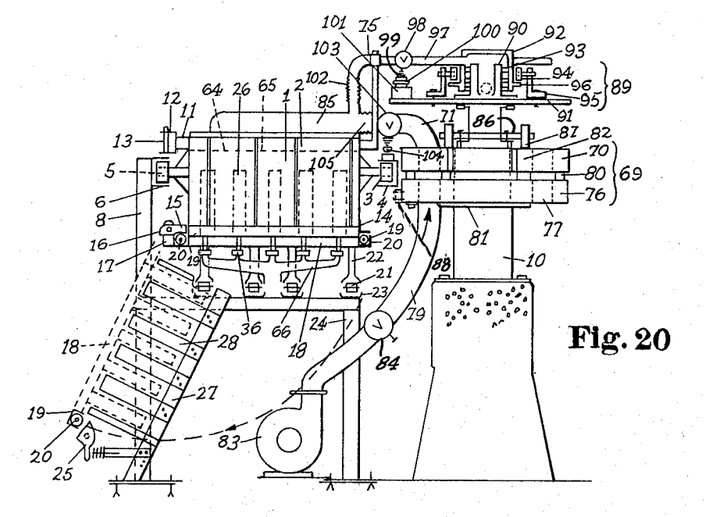

FIGURE 20, diagrammatic front view of the mechanism.

Figure 21:
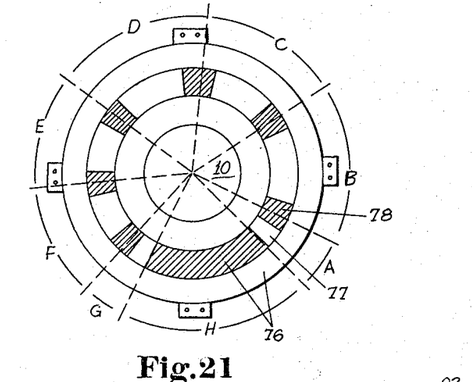

FIGURE 21, diagrammatic plan view of the fixed part of a distributor of fluids under pressure.

This distributor is of the same construction as the one used for vacuum.

Fluids under pressure go through it from bottom to top.

They are conducted in the pipes corresponding to the openings, as for the liquids by pumps 83, the output of which is adjustable by the valves 84. Liquids flow from the mobile part toward the pans through the pipes 85, of which there is one per pan.

An opening is connected to a compressed air stand-by balloon if the distributor also supplies the compressed air necessary to blow away the liquids in the pan and dry up the cake. Hereafter it will be explained that this air may be blown by a single separate air distributor, the one above mentioned being utilized only, in this case, for the liquids under pressure.

The pressure has a tendency to lift up the mobile part of the distributor. In order to prevent this, the filter central column bears axles 86 fitted with rollers 87 which press on the mobile part during its rotary motion.

The axles may be adjusted in height by sets of spacing pieces or by pressure screws.

Because of their relative position, the traveling way of the inner rollers of the pans may be fixed by a girdle 88 at the fixed part of the distributor.

G—SEPARATE COMPRESSED AIR DISTRIBUTOR

Compressed air to blow away the liquids in the pans, when the pumps have stopped their action and to dry up the cakes, is supplied by a separate air distributor 89.

It is mounted on the central column (see FIGURE 20).

The compressed air comes from the standby balloon at the bottom of the fixed part 90, fixed on the seat 91. This fixed part is externally machined. Around this piece turns a rotary head 92.

Airtightness is ensured by the segments 93. Rollers 94 are kept in place by the supports 95 fixed on the central column and are adjustable in height in relation to the collar of the rollings 96.

The rotary head holds as many air outlet pipes 97 as there are pans.

Compressed air can be used only during a part of the operational cycle. To adjust this supply, each air outlet pipe is fitted with a valve 98, the stem of which holds a return spring 99 and at the end a roller 100. This valve is of the normally open type.

To close the valve, the stem roller climbs on a thickness cam 101. When it is interrupted, the spring opens the valve. The length of this circular cam is dependent on the operational cycle. Its edges are beveled in order to facilitate the work of the valve stem roller.

The cam is made of two elements, male and female, which work together by sliding and have the same thickness.

The male part has a width inferior to that of the roller which therefore will always bear on either the male part or on the female part. The adjustment of the length is easy even during operation. The male part may be blocked by screws going through the female part.

The outlet pipe of the rotary head is connected to the inlet pipe for the pan liquids. A flexible tube 102 inserted in the air piping absorbs eventual small buckles of the assembly.

In order to drive the rotary head in synchronization with the pans, the arm used for the fluid distributor is lengthened and held on the air outlet pipe with interposition of a rubber block.

If this air distributor is used, it is preferred to isolate the distributor of the liquids under pressure every time the compressed air is injected in the pan. The following system is more efficient than a partition wall in the fluid distributor, which theoretically should suffice.

The pipe for liquids under pressure is fitted with a valve 103 of the same type as the one described above for air.

Usually open, it closes by the action of a thickness cam 104, designed the same way as the one described for air. This cam is for example fixed on the traveling way of the internal rollers of the pans. A flexible pipe 105 will absorb eventual minor buckles.

H—INFLATABLE AIRTIGHT JOINT

Figure 22:
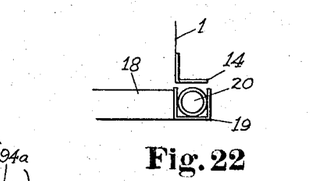
Figure 23:
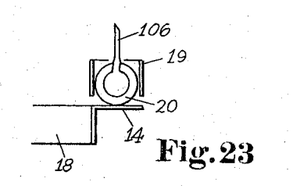

It is obvious that the airtight joint of the pan described in the first part and illustrated on a larger scale in FIGURE 22 may be reversed according to the illustration of FIGURE 23. If in addition the joint is made of a molded rubber continuous tube or made of any other flexible and resistant material, it may be fitted with inflated pipes 106.

The inflation ensures a thorough airtightness, if the pressure is high enough in the pan. It permits in all cases an easier return to position of the tilting bottom, the joint being thickened by inflating.

The joint must be deflated in the limits of zone H.

If the fluid distributor under pressure supplies air to the pans it cannot operate for inflation, the timings of the operation being too far away. The inflation is then made by a small separate distributor, as illustrated in FIGURE 24: a diagrammatic view of the device for inflating the airtight joint of the pan.

It is a small scale model of the air distributor described under G and is provided with the same adjustment devices for the air supply: roller and spring valve, flexible thickness cam.

If the compressed air is supplied to the pans by the distributor described under G, this distributor is also utilized for inflating.

Figure 24:
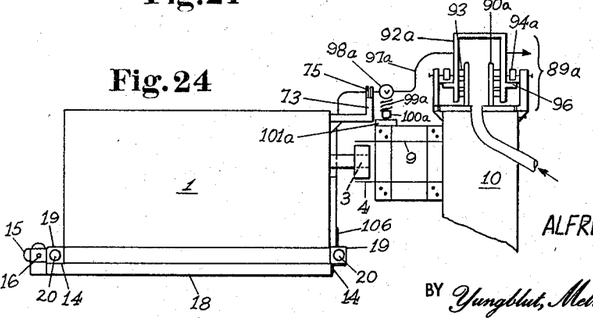

Its rotary head holds the set of pipes illustrated in FIGURE 24, together with their accessories, or the air is taken in shunt, before the valve, on air pipes towards the pans. The necessary pipes have the same accessories as described.

I—ROLLERS FOR THE COMPRESSION OF THE PAN AIRTIGHT JOINT

Figure 25:
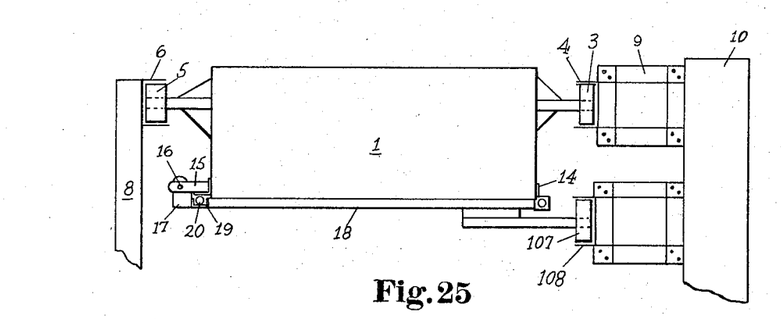

Instead of using the rollers and supports fixed at the bottom of the pans and their traveling ways as described hereabove, this material is replaced as illustrated in FIGURE 25—other crushing device of the pan airtight joint—by one or more side rollers 107, placed toward the inner portion of the filter, fixed on the bottom with a small height support and operating in the traveling way 108 fixed at the central column and interrupted in the H zone.

If, moreover, the tilting hinge is radially placed, one or more rollers may be placed on each side, that is, on the larger and on the smaller bottom base. There is then on each side a traveling way, interrupted in the H zone.

The filter operation is hereafter explained, in case of utilization under vacuum.

Each of the pans 1 operates one after the other in the same condition. It is sufficient to consider the performance of one of them and to generalize it for all the others.

Machines which create vacuum and blowers which will be mentioned hereafter, are put in operation. The appropriate filter drive puts it in a continuous and uniform rotary motion by the toothed rack 12–13.

Rollers 3 and 5 turn in their respective traveling ways 4 and 6, maintained by the supporting framework 8, 9, 10.

The arms 73 fixed to the pans are supported on shock absorbing blocks 75 and the arms 74 of the mobile part of the vacuum distributor 69.

This part revolves on the fixed part 76 connected with the pipe 79 to the vacuum separator, one pipe per opening, for various uses hereafter mentioned. The joint 80 ensures airtightness between the two parts of the distributor.

Starting the operational cycle, when the filtering cloth washing is over, the tilting bottom 18, around its hinge 15, 16, 17, resumes its horizontal closed position.

The watertight joint 20 crushes the U-shaped bar 19 and the seat 14 girdling the pan. By the uplifting and tightening of the bottom, the airtight joint of the vacuum circuit 68 is crushed between the two inclined girdles 67 and 72 and creates an airtight connection with the distributor.

The pipe 71 moves at this moment above the opening 77 section A, FIGURE 17, of the filter cloth drying step. Vacuum is transmitted by the circuit: opening, pipe 71, collector 66, pipe 37 to the cells 26.

Air is drawn from the exterior towards the interior of the cells and dries the filtering cloth.

The same result may be obtained if instead of using vacuum, the depression in the cells is created by a blower sucking 200 to 400 millimeters C.W., by the opening 77 section A.

This solution is often preferred in order to avoid a decrease of the vacuum level at the pans by the massive admission of air. The pan is isolated from this opening by passing over the partition wall 78—sections A–B.

At this point of its rotary motion the pan presents itself underneath the pipe of a quick and adjustable feed of a reservoir under pressure and containing the slurry to be filtered (not illustrated).

The pan is open at the top. The slurry goes through windows 65 of the distributor 64 in order to submerge the cells as rapidly as possible and to avoid the free settling of the slurry solids. Immediately thereafter, the vacuum is applied through the opening, section B.

The vacuum sucks the rich liquors of the slurry through the filter cloth which retains the solid particles in order to form the cake. The vacuum continues to be applied and absorbs the adjustable outflow of a second feed pipe. The cells have to be submerged during their passage under vacuum.

The rich filtrates flow through the distributor toward the corresponding separator. The adjustment of slurry output and the length of the opening must ensure at the end of this operation the thickness of the desired cake. The pipe 71 begins to overhang the partition wall sections B–C. The pan has left the slurry feeding zone and enters the first liquid washing zone.

At the opening C, the liquid goes through the cake and comes through the second filtrate separator. The same operations will be repeated for a second and a third washing in sections D and E. The various filtrates are in general recycled in view of a methodical washing. The last feeding of liquid has stopped when pipe 71 comes to the partition wall sections E–F. The vacuum filters the rest of the liquids, air is strongly introduced in the cell through the cake which is partially dried, by the opening F. The opening G is not connected to vacuum, but to the output of a blowing ventilator. Air blown at 200–400 millimeters C.W. goes through the distributor toward the inside of the cells and loosens the cake from the filtering cloth.

Rollers 21 come now into the H zone where the travelling ways are interrupted. The bottom 18 pivots downwardly. A part of the solids falls down by gravity during the tilting. The bottom makes the lug 25 swivel, pressing down its spring. The spring return allows the lug to retain the bottom and the cells in an inclined position illustrated in broken lines in FIGURE 2. The lug has a head with a rotary part, not illustrated, which allows the bottom to advance easily bearing on the lug. The airtight joint of the vacuum circuit is no problem for the tilting. The solids scrapers 28 go in between the cells at a few millimeters from the walls and push in front of them the remaining solids between the cells. The solids fall down into a fixed hopper. Immediately afterwards, the injection ramps 30 also pass in between the cells. These ramps are made of pipes with adjustable output drilled with holes or slots or fitted with sprinklers, along the areas adjacent the filter cloth generators. Pressure water spraying removes the residual solids, including those entrapped in the filter cloth meshes.

Water and solids coming from this washing are recycled as last cake washing liquid, thus allowing a total solid recuperation.

Flexible bands 31 incurve on the cells. The first band prevents the washing water from reaching the solids scrapers, the second one preventing spraying in the other direction and ensuring a partial wiping of the cells.

The flexible bands 31 may be doubled if need be.

When the bottom has passed the last flexible band, it is still retained for a short time by the lug. Later on it returns to the vertical due to its own dead weight.

Rollers 21 have then taken a well determined position.

Spiral 32, placed toward the outside with a certain security margin, then curves toward the inside of the filter, engages a roller 21 and leads it towards the tulip-shaped entries of the travelling ways 23, the interruption of which is terminated.

The watertightness of the pan is accomplished as previously described. The filter is ready for a new cycle.

It is obvious that the cycle phases may change by a different construction of the fixed part of the distributor, and as far as the quantity, the length and the purpose of the openings are concerned, without impairing the principles of the filter operation.

If the filter should operate under pressure, FIGURES 19 and 20, the operating phases are similar to what has been explained hereabove.

All the pans perform the same duty:

The rotation of pans 1, on rollers 3 and 5, working in the travelling ways 4 and 6;

The driving of the mobile part 70, by the arms 73–74 and the shock absorbing block 75, the construction of the fixed part of the mobile part of joint 80;

The operation of rollers 21 and supports 22, with the interrupted travelling ways 23;

The airtightness of joint 20, etc., are unchanged as regards the filter under vacuum. The liquids flow freely away from the collector 66.

The functioning hereafter described considers first of all that the fluids distributor under pressure, distributes also the compressed air which is necessary to the pans and that the watertight joints 20 are not inflated.

In the same manner as the description of the operation under vacuum, the bottom has been lifted up and airtightness has been realized.

Pans 1 are closed on the top and form a tight box able to resist the operating pressure.

The pipe 71 corresponding to the pan under consideration, is presented on top of the opening 77—section A FIGURE 21.

This opening is connected to the compressed air supply source.

The air goes through the distributor piping 85, the pan and, from the outside to the inside, through the cloth which it dries and goes out through the collector 66.

The same result is obtained if instead of compressed air, the opening were the delivery of a ventilator blowing 200–400 mm. C.W.

The blower is isolated when the pipe 71 goes over the partition wall 78 section A–B. The opening section B is connected to the delivery of the slurry pump 83 which is itself connected to the slurry reservoir. This pump is designed to create pressure. This pressure does not go up as long as there is air in the pan, and therefore the output of the pump is large and the flow rapid. The pressure increases and is adjusted to the required amount by valve 84. The liquids go through the cloth. The solids are kept back.

If necessary the filtrates passing at the beginning of the filtration may be directed toward a hopper which is separated from the rich liquids 1.

Indeed, the freshly washed cloths let pass, at the beginning, fine particles which pollute the filtrates. The liquids become clear when some of the solids are deposited on the cloth and constitute a good filtering medium. The polluted liquors which have been separated are recycled in the slurry and pass again through the filter. The length of opening B and the adjustment of the output of the pump 83 permit to obtain at the end of the operation a cake of the desired thickness.

Pipe 71, corresponding to the pan under consideration, passes over partition wall 78 sections B–C, which stops the output of the slurry pump on opening section C connected to another pump 83 for the first washing liquids. The pressure is adjusted by means of a valve such as 84 or any other conventional device.

The same operations are repeated on partition walls and openings D–E of the second and third washing. The partition wall sections E–F isolate these washings. Opening F is connected to the compressed air circuit which blows away the pan liquids and dries the cake.

Opening G is connected to the inlet of a ventilator under 200 to 400 millimeters C.W. The depression causes the air to enter through collector 66 toward the pan and the cells 26. The cakes break off.

The bottom 18 tilts. A great part of the solids naturally falls down. The following operations are the same as described above under vacuum operation.

Whether the compressed air is supplied by the separate distributor 89 instead of the described distributor 69, the air reaches pipes 85.

The air supply is connected to the one or to the other. Instead of adjusting the air supply with the openings and the partition walls of the distributor 69, the distributor 89 supplies the same quantity of air at the same moment because of the spacing cam 101 and of the valve 98.

Accessorily, the distributor 69 may be isolated with cam 104 and valve 103 which work as follows:

The fixed part 90 receives air from its source. The rotary head 92, the airtightness of which is ensured by segments 93, bears for each pan the normally open valve 98 the stem of which is fitted with a return spring and a roller 100.

This head rotates in synchronism with the pans by means of the arms 73 which bear on blocks 75 fixed on pipes 97 of the rotary head. The rollers 94 operating on the collar 96 prevent it from lifting up. The spacer cam 101 closes the valve 98 when the liquids are fed to the pans by the pumps 83.

It is interrupted; the valve opens when the air is supplied for the drying of the cloth (corresponding to Section A) and for the drying of the cakes (corresponding to Section F).

Under the same working conditions, the valve 103 closes by means of cam 104 when the valve 98 opens or it opens by the interruption of the cam when the valve 98 closes.

The separate distributor 89 protects the tightness joint 80 when operating pressure is high but does not change anything in the operation of the filter.

If the airtight joint 20 is inflatable, FIGURE 24, and if for the pans the air is supplied by distributor 89 and its accessories, this distributor supplies by another set of pipes and accessories, illustrated at 97a to 101a, compressed air to the pipes 106, for the inflation of molded, continuous, inflatable tube 20.

The cam 101a is provided only to close the air supply at joint 20, when the pan is in the H zone of tilting and lifting up. The valve stem 98a opens when going up a pin, not shown, that frees the compressed air in joint 20.

Instead of being on the rotary head, the pipe 97a may be shunt mounted on the pipe 97 before the valve 98.

If the air for the pans is supplied by the distributor 69, the central column 10 holds a small distributor 89a only for the inflation which may be described and which operates in the same manner as the distributor 89.

The operation of the roller or of the side rollers 107 in the travelling way or in the interrupted travelling ways 108 is the same as the rollers 21 and the interrupted travelling ways 22.

In fact, vacuum and pressure are alternative ways to utilize the filter, the alternatives for the devices being:

(A)—Open pan for vacuum, closed for pressure.

(B)—Vertical, horizontal or inclined cells fixed to the bottom of the pan operate under the same conditions.

(C)—The same remark is valid for vertical cells integral with the pan.

(D)—The distributor is fitted with openings or uniform drilled holes.

(E)—The collector is closed under vacuum, open under pressure.

(F)—The distributors are the same, but the accessory equipment is adjusted. The vacuum pumps are replaced by an air compressor and liquid pumps. Each ventilator of the blowing type becomes a fan of the suction type and vice versa.

(G)—The separate air distributor does not change anything in the operation of the filter.

(H)—The tightness joint, inflatable or not, is applicable in all cases.

(I)—Another position of the compressing rollers of the pan tightness joint may be utilized in all cases.

These alternatives do not change anything in the basic principles of the filter and its practical operation.

Of course, the invention is not limited to the forms of execution which have been described and illustrated as an example and modifications may be made without departing from the scope of the invention.

For indication purposes, the comparison between an horizontal table having an inside diameter of 2 meters and an outside diameter of 4 meters with a filter of the same dimensions, with 16 pans of 8 cells each, of a height of .4 meters shows that:

The area of the filtration cloth for the table filter amounts to 9.42 square meters.

The area for the filter according to the present invention is 56.32 square meters.

Coefficient of filtering area increases, six.

The embodiments of the invention in which an exclusive property or privilege is claimed are defined as follows:

1. A continuous rotary filter comprising:
   a plurality of filtering pans mounted for rotation in a horizontal plane around a vertical axis;
   a plurality of filter cells in each pan provided with filter cloths;
   a bottom for each of said pans pivotally secured thereto along one edge by a hinge having a substantially horizontal axis;
   a watertight seal between each pan and its bottom extending around the periphery of said bottom;
   means for holding each bottom in close engagement with its pan during a portion of the rotary travel thereof, said means comprising rollers attached to the underside of each bottom and horizontal, circular tracks on which said rollers rotate;
   means for releasing each bottom for swinging movement downwardly about said substantially horizontal axis during another portion of the rotary travel thereof, said means comprising interruptions in said circular tracks;
   means for applying a vacuum disposed adjacent said vertical axis, and radial connections between said vacuum applying means and the interiors of said cells effective to apply vacuum to the interiors of said cells during said portion of rotary travel;
   means operative during said other portion of rotary travel to remove solids deposited on said filter cloths;
   and means for thereafter swinging each bottom upwardly into watertight engagement with its pan, said means comprising at least one spirally curved element positioned to engage said rollers in the position assumed thereby when said bottom is released, said element curving gradually upwardly to merge with said horizontal circular tracks.

2. The filter claimed in claim 1, wherein each said bottom is secured to its pan along the outer peripheral edge thereof by a hinge having an axis tangential to the rotary path of travel of said pans; wherein said cells are secured to said bottoms; wherein said radial connections are secured at their outer ends to said bottoms and are provided with releasable airtight joints intermediate said outer ends and said vacuum applying means, thereby permitting said downwardly swinging movement of said bottoms during said other portion of rotary travel; and wherein said means to remove solids deposited on said filter cloths comprise scrapers positioned to pass between said cells after each said bottom swings downwardly, and washing devices positioned to pass between said cells after said scrapers and to direct fluid under pressure onto said filter cloths.

3. The filter claimed in claim 1, wherein said cells are secured in said pans; wherein each said bottom is secured to its pan along a side edge thereof by a hinge having a radial axis; wherein said radial connections terminate in the lower portions of the interiors of said cells and are free from engagement with said bottoms; and wherein said means to remove solids deposited on said filter cloths comprise means for supplying air under pressure to said radial connections.

4. A continuous rotary filter comprising:
   a plurality of filtering pans mounted for rotation in a horizontal plane around a vertical axis;
   a plurality of filter cells in each pan provided with filter cloths;
   a bottom for each of said pans pivotally secured thereto along one edge by a hinge having a substantially horizontal axis tangential to the rotary path of travel of said pans, said cells being secured to said bottoms;
   a watertight seal between each pan and its bottom extending around the periphery of said bottom;
   means for holding each bottom in close engagement with its pan during a portion of the rotary travel thereof, said means comprising rollers attached to the underside of each bottom and horizontal, circular tracks on which said rollers rotate;
   means for releasing each bottom and the cells secured thereto for swinging movement downwardly about said substantially horizontal tangential axis during another portion of the rotary travel thereof, said means comprising interruptions in said circular tracks;
   means for distributing liquid under pressure disposed adjacent said vertical axis, radial connections between said liquid distributing means and said pans effective to supply liquid under pressure to the exteriors of said cells during said portion of rotary travel, said pans having closed tops through which said connections pass, and liquid collectors open to atmosphere communicating with the interiors of said cells;
   scrapers disposed to pass between said cells after each said bottom swings downwardly, whereby to remove solids disposed on said filter cloths;
   washing devices disposed to pass between said cells and to direct fluid under pressure onto said filter cloths after said scrapers, whereby to remove residual solids deposited thereon;
   and means for thereafter swinging each bottom upwardly into watertight engagement with its pan, said means comprising at least one spirally curved element positioned to engage said rollers in the position assumed thereby when said bottom is released, said element curving gradually upwardly to merge with said horizontal circular tracks.

References Cited

UNITED STATES PATENTS

| 869,372 | 10/1907 | Kelly | 210—486 X |
| 945,193 | 1/1910 | Ridgway | 210—385 X |
| 2,266,402 | 12/1941 | Banks | 210—331 X |

FOREIGN PATENTS

| 39,745 | 11/1931 | France. |
| 127,675 | 10/1900 | Germany. |

SAMIH N. ZAHARNA, *Primary Examiner.*

REUBEN FRIEDMAN, *Examiner.*

F. SPEAR, *Assistant Examiner.*